United States Patent [19]

Lieb et al.

[11] Patent Number: 4,759,203
[45] Date of Patent: Jul. 26, 1988

[54] STEERING AND IGNITION LOCK FOR A MOTOR VEHICLE

[75] Inventors: Kurt Lieb, Seligenstadt; Dittmar Schwab, Rodgau, both of Fed. Rep. of Germany

[73] Assignee: Ymos Aktiengesellschaft Industrieprodukte, Obertshausen, Fed. Rep. of Germany

[21] Appl. No.: 919,803

[22] Filed: Jul. 26, 1988

[30] Foreign Application Priority Data

May 13, 1986 [DE] Fed. Rep. of Germany ....... 3616122

[51] Int. Cl.$^4$ ............................................. G60R 25/02
[52] U.S. Cl. ........................................ 70/185; 70/252
[58] Field of Search .......................... 70/252, 185, 186

[56] References Cited

U.S. PATENT DOCUMENTS 4,232,571 11/1980 Kimberlin .............................. 70/252
4,333,325 6/1982 Morikawa .............................. 70/186

FOREIGN PATENT DOCUMENTS

22886    1/1981  European Pat. Off. ............. 70/252
1455524  4/1969  Fed. Rep. of Germany ........ 70/252
2222306  3/1973  Fed. Rep. of Germany ........ 70/252
2311155  9/1974  Fed. Rep. of Germany ........ 70/252

Primary Examiner—Robert L. Wolfe
Attorney, Agent, or Firm—W. G. Fasse; D. H. Kane, Jr.

[57] ABSTRACT

A steering and ignition lock has a locking cylinder which is provided on its circumference with a control cam for cooperation with a control pin (16). A slide member is linearly displaceable if released by the control pin which may be moved into and out of the path of the slide member to lock the slide member or to release the slide member. The slide member is either connected, for example through a Bowden cable, to the transmission selector lever, or to a safety lever so that the operability of the steering and ignition depends on the prior operation of the gear shift lever or of the safety lever.

21 Claims, 6 Drawing Sheets

STEERING AND IGNITION LOCK FOR A MOTOR VEHICLE

FIELD OF THE INVENTION

The invention relates to a steering and ignition lock for a motor vehicle. Such locks include a locking cylinder rotatably supported in the steering lock housing for cooperation with spring biased tumblers displaceable in latch channels. The locking cylinder further controls a latch bolt which is displaceable into a recess in the steering column of the vehicle to lock the steering wheel against rotation.

DESCRIPTION OF THE PRIOR ART

Steering and ignition locks of the above described type are well known in the art in various modifications, especially constructed to perform additional functions in satisfaction of the respective legal rules in different countries. For example, in the Federal Republic of Germany it is necessary that such a steering and ignition lock comprises a safety mechanism which is responsive to the withdrawal of the key. The safety mechanism makes sure that the latch bolt can engage the steering column only if the key has switched back the locking cylinder into the parking or locked position and is almost withdrawn or the key tip is about to leave the key channel in the locking cylinder. In the United States of America manufacturers' standards require that the steering and ignition lock is equipped with additional structural features which make sure that the selector lever of the automatic transmission is in the parking position to permit the locking cylinder to assume the zero or locking position. Similarly, the selector lever of the automatic transmission can be taken out of the parking position only when the locking cylinder has been rotated out of the locking position or into the ignition position. In those vehicles which do not have an automatic transmission in the United States, but are rather equipped with a standard transmission, the locking cylinder must be rotatable out of an operating position into the parking or locking position only if additionally a safety lever is displaced. These requirements have led to the situation that the known steering and ignition locks are rather expensive because they comprise complicated additional components which are not only expensive, but are also subject to malfunctions making these conventional steering and conventional locks trouble-prone. As a result, the operational safety of such conventional steering and ignition locks leave room for improvement.

OBJECTS OF THE INVENTION

In view of the foregoing it is the aim of the invention to achieve the following objects singly or in combination:

to construct a steering and ignition lock of the type mentioned above in such a way that it is compact and inexpensive, while simultaneously having features which permit an easy adaptation to the above mentioned various requirements, for example, those that must be met in the United States of America;

to minimize the number of structural components that are needed for satisfying the various requirements that must be met by such locks;

to install the components needed for the performance of different functions in one and the same basic housing; and to arrange a slide member so that it may be operated by different types of operating elements, for example, a rotatable or a displaceable operating element.

SUMMARY OF THE INVENTION

According to the invention the steering and ignition lock is characterized by the following features. The locking cylinder is provided on its circumference with a control cam or curve. A control body is arranged for cooperation with the control curve. A slide member is so arranged that the control body is movable into the slide path of the slide member. The slide member is operated either by a linear motion transmitting element or by an element for converting a rotational motion into a linear motion. The linear motion transmitting element comprises a connector, one end of which is connected to the slide member and the other end of which is connected to the shift or selector lever of an automatic transmission. In the embodiment in which the element for converting a rotational motion into a linear motion is used, the converting element cooperates with a safety lever.

The foregoing features make it possible to produce a steering and ignition lock having relatively small dimensions which are hardly larger than a conventional steering and ignition lock without any additional functions. Only a few components are needed for the additional functions, and these additional components are very small so that they can be mounted within the volume of a conventional lock of this type. Due to the use of a slide member, it is possible to house the components for the different functions in one and the same basic housing because the slide member can be operated either by a linear motion element such as a Bowden cable or by an element for converting a rotational motion into a linear motion, whereby the converting element may be a control lever tiltable about an axis.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
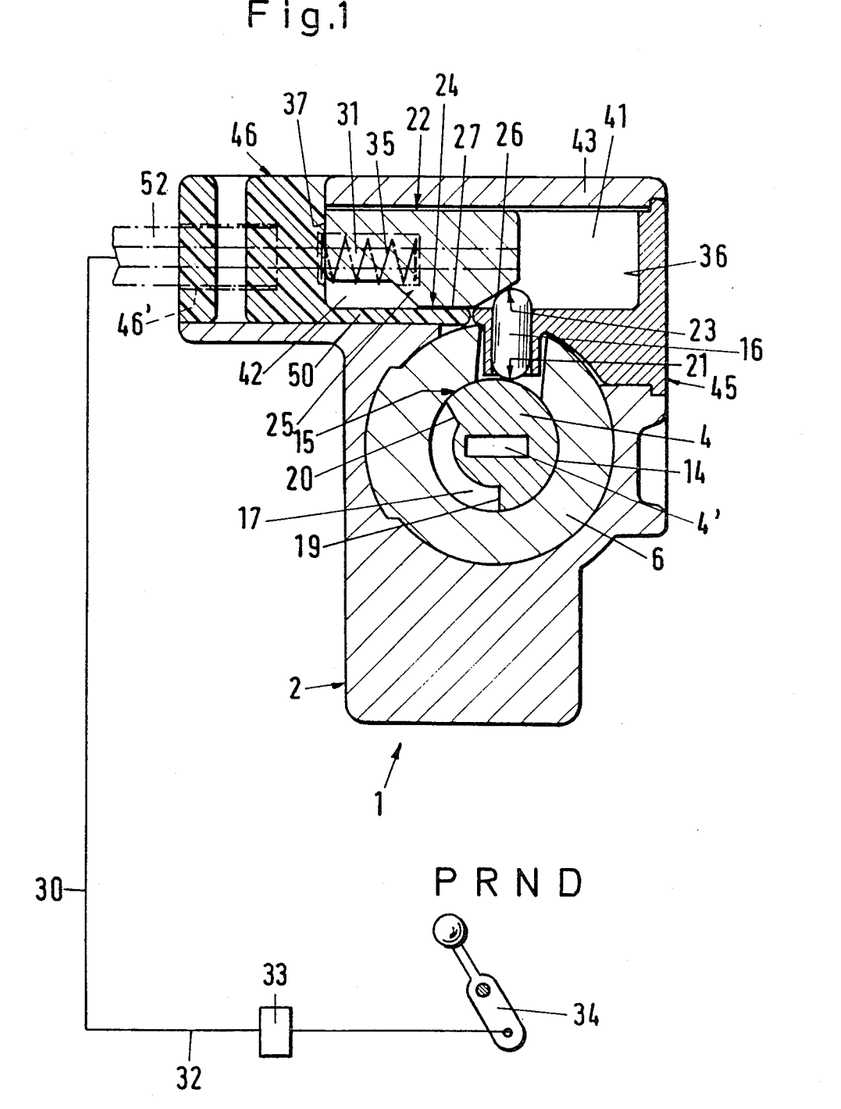
FIG. 1 is a sectional view through one embodiment of a steering and ignition lock according to the invention shown in the parking or locked condition, whereby the section extends along line I—I in FIG. 7, and wherein a slide member is operated by a push-pull cable.
Figure 7:
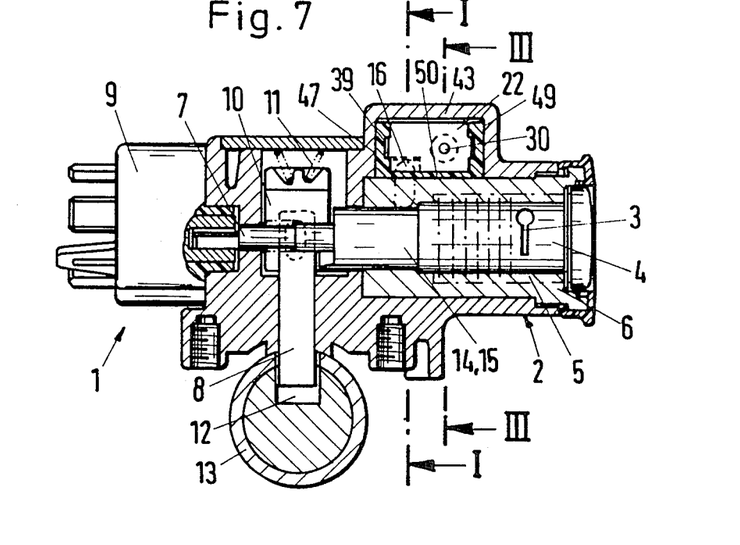
FIG. 7 is a longitudinal sectional view through the steering and ignition lock according to the invention showing the general arrangement of components which is the same for both embodiments.

Referring to FIG. 1, the steering and ignition lock 1 for a motor vehicle comprises a housing 2 also shown in section in FIG. 7. A locking cylinder 4 is rotatably mounted in the housing 2 and carries spring loaded tumblers 3 of conventional construction. In the locking position shown in FIG. 1 the tumblers 3 engage into latch channels 5 visible in FIG. 7. These latch channels 5 are preferably arranged in a bushing 6 directly enclosing the locking cylinder 4. The locking cylinder 4 has a projection 7 for controlling a latch bolt 8 and an electric switch 9 through an excentric cam member not shown in the Figures. The latch bolt 8 is attached to a control body 10 which is biased by a spring 11. In the locking position when additionally the key is withdrawn, the latch bolt 8 reaches into a recess 12 of the steering column 13 of a vehicle not shown. The structure so far described is conventional, whereby the locking cylinder 4 may either be only rotatable in the bushing 6 or it may also be axially displaceable for the purpose of performing further functions not of interest in this context.

Figure 2:
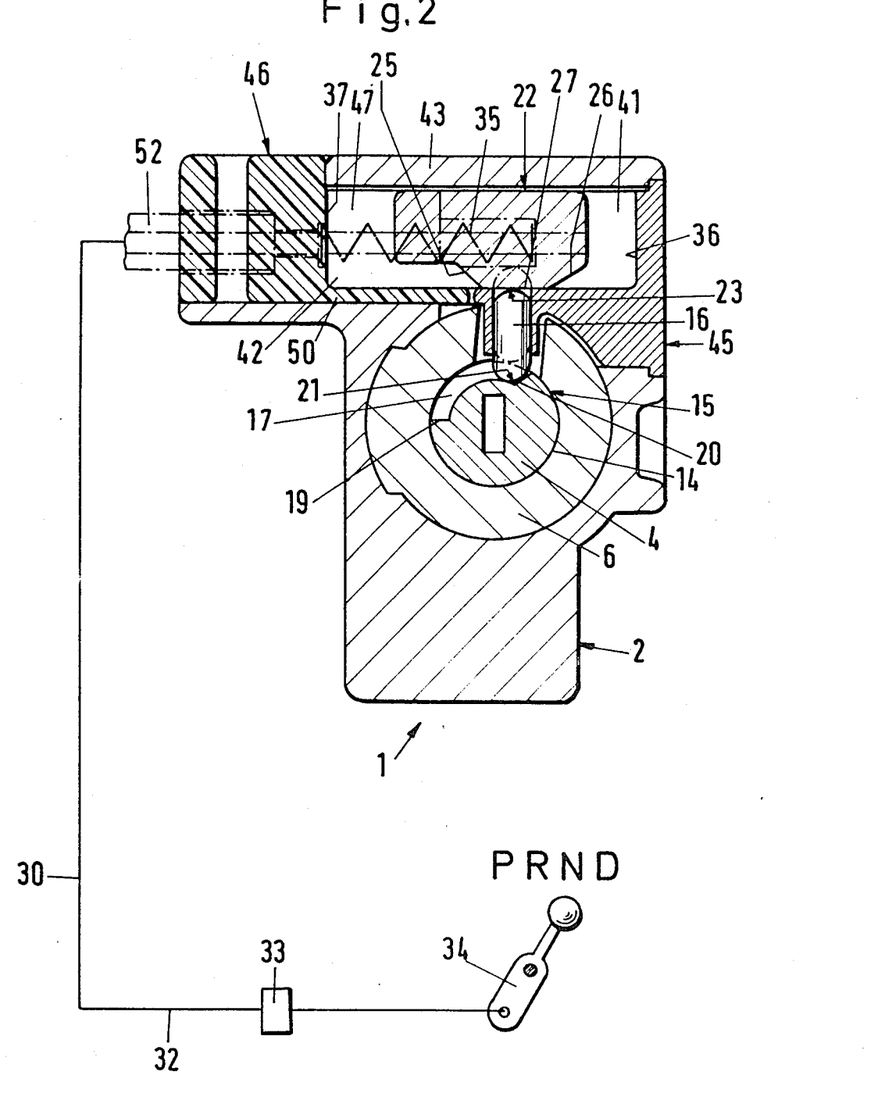
FIG. 2 is a sectional view similar to that of FIG. 1, however, showing the present lock in an unlocked or operational condition permitting the steering.

The locking cylinder 4 comprises according to the invention for achieving the objectives of the invention a control curve or cam 15 extending along the circumference 14 of the locking cylinder 6. Further, a control body 16 is provided for cooperation with the control cam 15 as shown in FIG. 1. The control cam 15 forms part of the cylindrical circumference 14 of the locking cylinder 4 and includes a recessed cam portion 17 extending radially inwardly from the circumference 14. The recessed cam portion 17 has a first end surface 19 extending substantially radially relative to a central rotational axis of the locking cylinder 4 and a second end surface 20 extending substantially along a chord line. The control body 16 is essentially a pin which is movable in its longitudinal direction and so arranged that its displacement in its axial direction extends substantially radially relative to the locking cylinder 4. One end 21 of the pin shaped control body 16 contacts or engages continuously the cylindrical circumference 14 or the control cam 15 including its recessed portion 17 as shown in FIG. 2. The slanted end surface 20 of the control cam 15 causes a lifting of the control body or pin 16 when the locking cylinder 4 is rotated. On the other hand, when the radially extending end surface 19 of the cam 15 engages the control body 16, a further rotation of the locking cylinder 4 is prevented.

Figure 3:
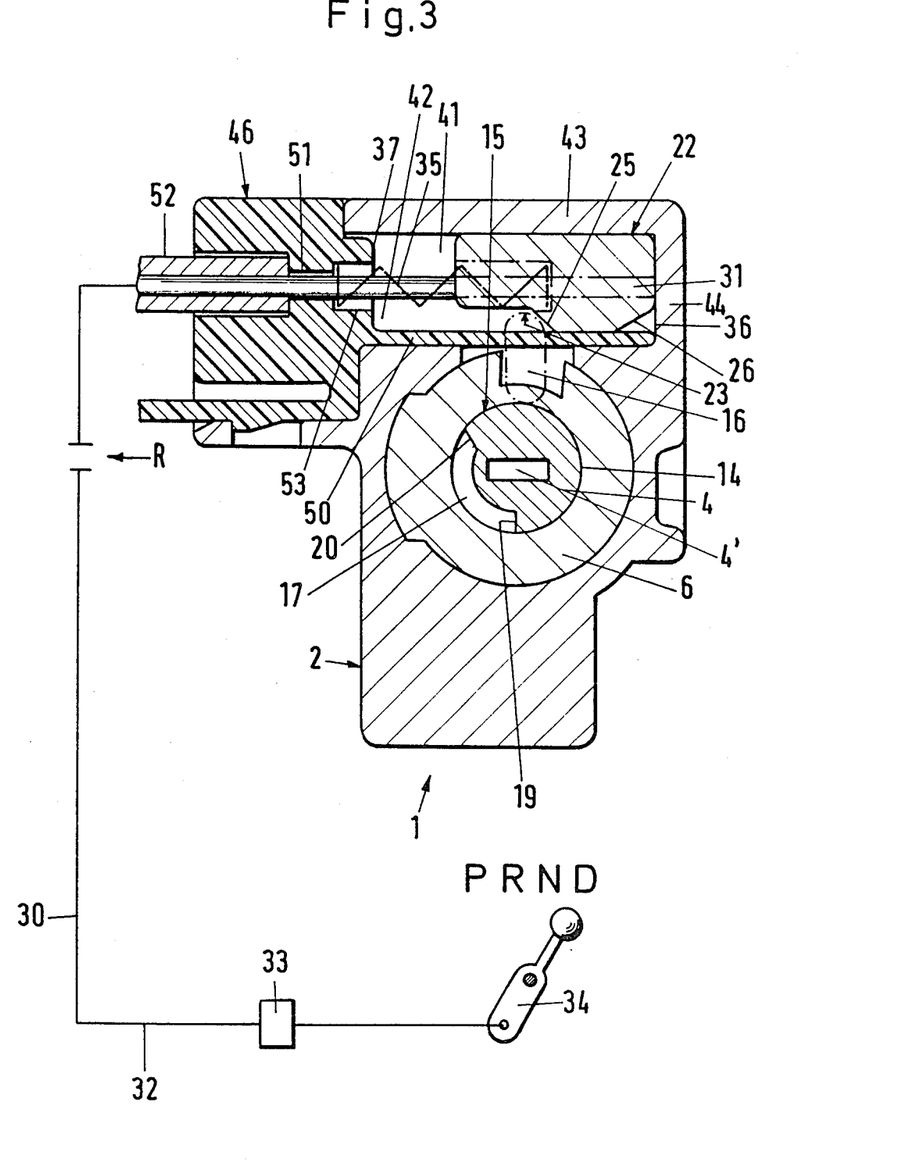
FIG. 3 is a sectional view through the lock along section line III—III in FIG. 7 with a slide member shown in an emergency position.

FIGS. 1 and 2 further show a slide member 22 so arranged that the control pin or body 16 is movable into the displacement path of the slide member 20. For this purpose the second or other end 23 of the control pin 16 cooperates with the slide member 22. For this coaction the slide member 22 has a cam surface 24 including several sections as shown in FIGS. 1, 2, and 3. These sections include two slanted surfaces 25 and 26 converging toward the control pin or body 16 and a plane surface 27 between the converging surfaces 25 and 26.

In the locked position corresponding to the parking position shown in FIG. 1 the control pin 16 engages with its one end 21 the cylindrical circumference 14 or rather the cylindrical portion of the control cam 15, whereby the control pin 16 is pushed radially outwardly, so that its other end 23 simultaneously reaches into the displacement path of the slide member 22 and the slide member 22 cannot be displaced in an unlocking, opening direction as shown in FIG. 1. In this position the slide member 22 bears with its slanted surface 26 against the end 23 of the control pin or body 16. The control body 16 in turn is prevented from yielding to the slide member 22 by the circumference 14 of the control cam 15 of the locking cylinder 4. However, when the locking cylinder 4 is rotated with a key so that its recessed cam portion 17 is moved to face the other end 21 of the control pin or body 16, the latter can yield, thereby entering with its end 21 into the recessed cam portion 17 of the locking cylinder 4. As a result, the upper end 23 of the control pin or body 16 moves out of the sliding path of the slide member 22, whereby the latter can be displaced to the right as shown, for example, in the embodiment of FIG. 1 so as to assume the position shown in FIG. 2.

Referring to FIG. 2, when the gear shift lever 34 is in the neutral position N, the plane surface 27 of the slide member 2 directly faces the upper end 23, thereby holding the control pin or body 16 in a position displaced downwardly toward the locking cylinder 4. Turning back the locking cylinder 4 into the locked position P which is the parking position as shown in FIG. 1, becomes only possible when the slide member 22 is pushed by an externally applied force into the original position shown in FIG. 1. For this purpose the invention provides a slide member operating means which in this embodiment is a connecting member 30 between the shift lever 34 and the slide member 22, for example, in the form of a Bowden cable connected with its one end directly to the slide member 22 and with its other end 32 either also directly to the gear shift selector lever 34 or to a compensating device 33 which in turn is connected to the gear shift lever or selector 34 which cooperates with an automatic transmission not shown.

A spring 35 biases the slide member 22 into an emergency position shown in FIG. 3 for example, when the connecting element 30 should have been severed as shown at R. Thus, the operational safety is still assured because the spring 35 pushes the slide member 22 into a position in which the second slanted surface 25 contacts the top end 23 of the control pin or body 16, whereby the locking cylinder 4 is freely rotatable by a key inserted into the key hole 4'.

The displacement path of the slide member 22 has a limited length defined by the stop surfaces 36 and 37 in the housing 2. The slide member itself also has a defined length. Thus, it is assured that the slanted surface 25 in the end position in FIG. 3 contacts the top end 23 of the control pin or body 16. This feature also assures that the other slanted surface 26 of the slide member 22 contacts the top end 23 of the control pin 16 in the other end position shown in FIG. 1.

The length of the slide member 22 and the position of the stop surfaces 36 and 37 is so selected that the top end 23 of the control pin or body 16 faces one or the other slanted surfaces 25 or 26 of the slide member 22 when the latter contacts either the stop surface 36 or the stop surface 37.

Viewing FIGS. 1, 2, 6, and 7 in conjunction, it is noted that the slide member 22 is guided in a chamber 41, 42 by a guide 39. The chamber 41, 42 is formed by walls 43, 44 and by an insert type housing member 46 as shown in FIG. 3. Instead of the wall 44 another housing insert 45 may be used as best seen in FIG. 1. The cassette type insert 46 provides the stop surface 37. The insert 46 also provides side walls 47, 49 and a bottom portion 50. The housing 2 is provided with a recess for the insertion of the insert 46, which is thus also easily removed again, for example for maintenance work. As shown in FIG. 7, the side walls 47 and 49 form together with the bottom 50 a chamber portion having a U-shaped cross-section. The other chamber portion is formed by the housing walls 43 and 44 or by the housing insert 45. Both chamber portions provide the guide 39 for the slide member 22.

The insert 46 which is a cassette type insert, has a passage 51 through which the end 31 of the Bowden cable 30 passes for connection to the slide member 22. The cable sheathing 52 of the Bowden cable 30 is anchored in a recess 46' of the insert 46. The left-hand end of the spring 35 is supported in a recess 53 of the insert 46 while the right-hand end of the spring 35 bears against the slide member 22, see FIG. 3.

Figure 4:
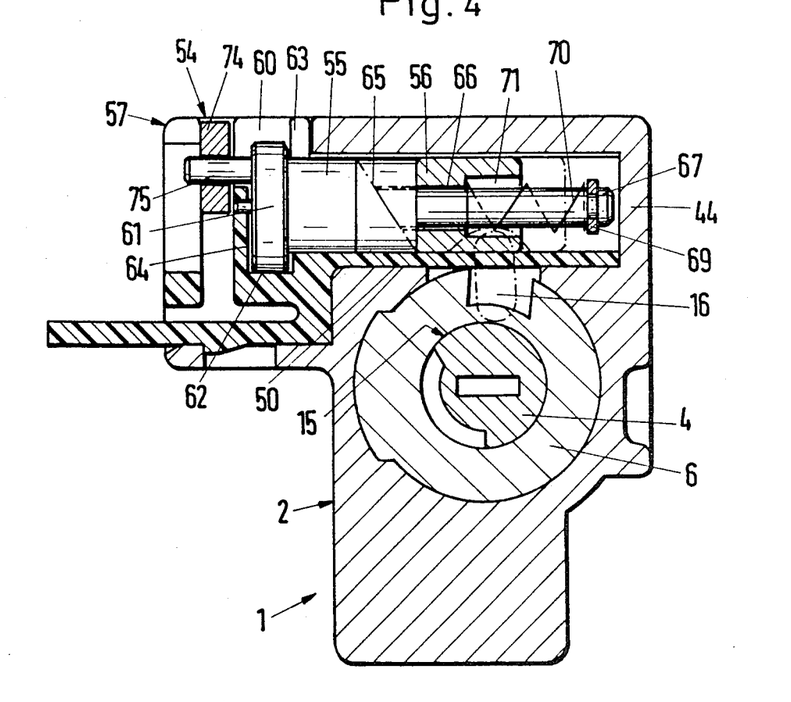
FIG. 4 illustrates a sectional view similar to that of FIG. 3, however illustrating a modified embodiment of the invention in which the slide member is operated by a control element for converting a rotational motion into a linear motion.
Figure 5:
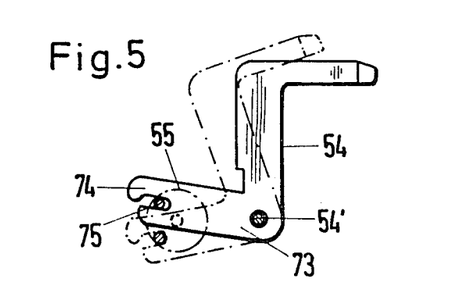
FIG. 5 is a side view of the control element of FIG. 4 in the form of a safety lever and shown on a somewhat reduced scale as compared to FIG. 4, but showing further details.
Figure 6:
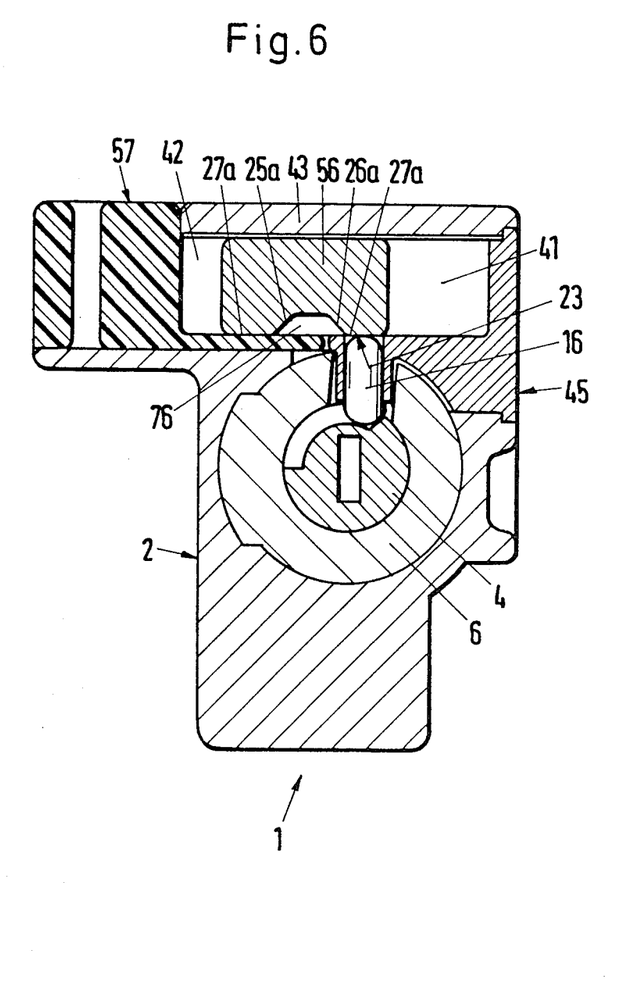
FIG. 6 is a sectional view similar to that of FIG. 2, but showing the second embodiment of FIG. 4.
Figure 8:
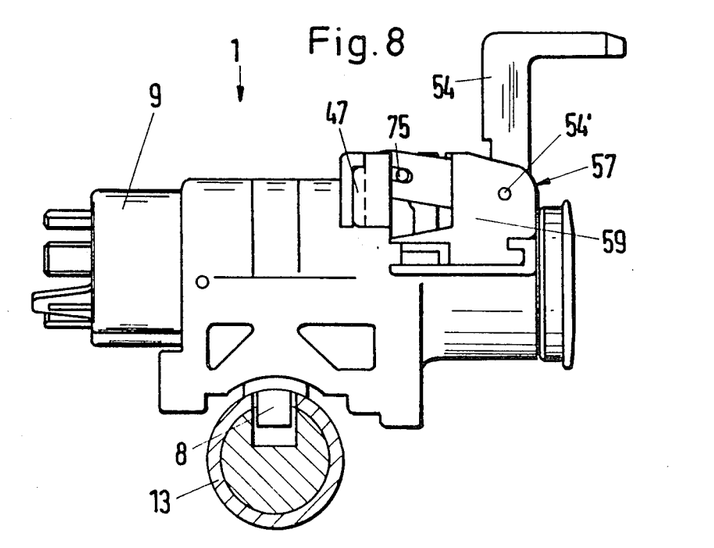
FIG. 8 is a side view of the embodiment of FIG. 4 on a smaller scale and showing the steering column in section.

Referring to FIGS. 4, 5, 6, and 8, these Figures show a modified embodiment in which the connecting element 30 between the slide member 22 and the gear shift lever 34 has been replaced by a safety lever 54. In this embodiment the cassette type insert has a somewhat modified shape outside the chamber portion 42 for supporting the safety lever 54 and a switching roller 55 as well as a slide member 56. The tilting or rotational motion of the safety lever 54 is converted into a linear motion by the switching roller 55 for displacing the slide member 56. However, the housing or the recess in the housing is so constructed that either the insert 46 or the insert 57 may be inserted to form the chamber for receiving the respective slide member 22 or 56. The insert 57 comprises a bearing block 59 forming a bearing chamber 60 for supporting the safety lever 54 as shown in FIGS. 4, 5, and 8. The safety lever 54 is tiltable about a fixed shaft 54' in the bearing chamber 60. A ring flange 61 of the switching roller 55 is guided in the chamber 60 between the bottom 62 and the vertical support walls 63 and 64. The switching roller 55 comprises at its end reaching into the guide or guide chamber 39 a slanted surface 65 for cooperation with a respective slanted surface of the slide member 56. The slide member 56 cooperates basically with the control pin 16 in the same manner as has been described above. Thus, the slide member 56 also has two slanted surfaces 25a and 26a, however, these slanted surfaces diverge relative to the control pin or body 16. Additionally, the slide member 56 has two plane horizontal surfaces 27a as best seen in FIG. 6.

A bore 66 extends entirely through the slide member 56 in the direction of the slide movement for receiving a pin 67 which extends away from the slanted surface 65 of the switching roller 55 as shown in FIG. 4. The free end of the pin 67 forms a ring shaped support 69 for one end of a spring 70. The other end of the spring 70 is supported in a recess 71 arranged concentrically around a bore 66 through the slide member 56. Thus, the slide member 56 is displaceable along the pin 67 against the bias or force of the spring 70 when the switching roller 55 performs a tilting or rotational motion. Depending on the instantaneous switching position, either the surfaces 27a or the surfaces 25a and 26a are located in front of the free end 23 of the control pin or body 16 when the slide member 56 moves linearly as may be seen by comparing FIGS. 4 and 6, please see also the dashed line position of the slide member 56 in FIG. 4.

FIG. 5 shows that the safety lever 54 has a switching arm 73 with a forked end 74 reaching around a stud 75 of the switching roller 55. A tilting or rotational movement of the safety lever 54 from the full line position shown in FIG. 5 counterclockwise into dashed line position shown in FIG. 5 results in a rotational movement of the switching roller 55 in the same direction and simultaneously in a longitudinal movement of the slide member 56 due to the facing slanted surfaces 65.

When the safety lever 54 is rotated, the pin 67 performs a respective rotational movement while the slide member 56 responds with a pure linear movement. Thus, the control pin or body 16 can move radially outwardly, relative to the locking cylinder 4 in response to the control cam 15, only if the free space 76 as shown in FIG. 6 between the two slanted surfaces 25a, 26a of the slide member 56, is located directly in front of the end 23 of the control pin 16. This position is achieved by tilting the safety lever 54, whereupon the locking cylinder 4 is freely rotatable.

Although the invention has been described with reference to specific example embodiments, it will be appreciated, that it is intended to cover all modifications and equivalents within the scope of the appended claims.

What we claim is:

1. A steering and ignition lock for locking a steering column and an ignition of a motor vehicle, comprising housing means, lock cylinder means supported in said housing means for rotation by a key, latching tumbler means controlled by said lock cylinder means, latch channel means for cooperation with said latching tumbler means, a latch bolt shiftable into said steering column for locking said steering column, safety means arranged in said housing means for locking or releasing said lock cylinder means in accordance with a safety requirement, said safety means comprising a slide member (22, 56) arranged for a linear sliding movement in said housing means, means for operating said slide member, control cam means (15, 17) on said lock cylinder means for locking or unlocking said lock cylinder means, and control means (16) arranged for cooperation with said slide member and with said control cam means on said lock cylinder means in response to an operation of said slide member operating means, and wherein said slide member operating means comprise connecting means for operatively connecting said slide member to a gear shift lever of said motor vehicle for linking an operation of said slide member with an operation of said gear shift lever.

2. The lock of claim 1, wherein said control cam means (15,17) comprise a first section as part of a cylindrical circumference (14) of said lock cylinder means and a second section forming a cam recess (17) extending substantially radially inwardly of said lock cylinder means.

3. The lock of claim 2, wherein said cam recess (17) has a first end surface extending about radially inwardly of said lock cylinder means for locking said lock cylinder means with said control means (16), and a second end surface extending about in the direction of a chord line of said lock cylinder means for releasing said lock cylinder means from said control means (16).

4. The lock of claim 1, wherein said control means comprise pin means (15) arranged for axial sliding movement in said housing means and for movement substantially radially relative to said lock cylinder means.

5. The lock of claim 1, further comprising spring means for biasing said slide member, and guide means (39) in said housing means for guiding a sliding movement of said slide member in a direction substantially perpendicularly to a movement direction of said control means (16).

6. The lock of claim 1, wherein said slide member (22, 56) comprises cam surface means (24, 24a) arranged for cooperation with said control means (16).

7. The lock of claim 6, wherein said cam surface means of said slide member comprise two slanted cam surfaces (25, 26) converging toward said control means (16) and a plane cam surface (27) intermediate said two converging cam surfaces for cooperation with said control means (16).

8. The lock of claim 6, wherein said cam surface means of said slide member comprise two slanted cam surfaces (25a, 26a) diverging toward said control means and two plane cam surfaces (27a) arranged on either side of said two slanted cam surfaces (25a; 26a) for cooperation with said control means (16).

9. The lock of claim 1, wherein said housing means comprise exchangeable insert means for mounting said slide member and said means for operating said slide member, said insert means being open toward said control means for permitting the cooperation of said slide member with said control means.

10. The lock of claim 9, wherein said connecting means for operating said slide member comprise a Bowden push-pull cable one end of which is mounted in said insert means.

11. A steering and ignition lock for locking a steering column and an ignition of a motor vehicle, comprising housing means, lock cylinder means supported in said housing means for rotation by a key, latching tumbler means controlled by said lock cylinder means, latch channel means for cooperation with said latching tumbler means, a latch bolt shiftable into said steering column for locking said steering column, safety means arranged in said housing means for locking or releasing said lock cylinder means in accordance with a safety requirement, said safety means comprising a slide member (22, 56) arranged for a linear sliding movement in said housing means, means for operating said slide member, control cam means (15, 17) on said lock cylinder means for locking or unlocking said lock cylinder means, and control means (16) arranged of cooperation with said slide member and with said control cam means on said lock cylinder means in response to an operation of said slide member operating means, and wherein said slide member operating means comprise a safety lever for operation by an operator of said vehicle, means for tiltably mounting said safety lever in said housing means and rotating motion converting means operatively connecting said safety lever to said slide member for moving said slide member in response to an operation of said safety lever.

12. The lock of claim 11, wherein said control cam means comprise a first section as part of a cylindrical circumference of said lock cylinder means and a second section forming a cam recess extending substantailly radially inwardly of said lock cylinder means.

13. The lock of claim 12, wherein said cam recess has a first end surface extending about radially inwardly of said lock cylinder means for locking said lock cylinder means with said control means (16), and a second end surface extending about in the direction of a chord line of said lock cylinder means for releasing said lock cylinder means from said control means (16).

14. The lock of claim 11, wherein said control means comprise pin means arranged for axial sliding movement in said housing means and for movement substantially radially relative to said lock cylinder means.

15. The lock of claim 11, further comprising spring means for biasing said slide member, and guide means in said housing means for guiding a sliding movement of said slide member in a direction substantially perpendicularly to a movement direction of said control means (16).

16. The lock of claim 11, wherein said slide member comprises cam surface means arranged for cooperation with said control means.

17. The lock of claim 16, wherein said cam surface means of said slide member comprise two slanted cam surfaces diverging toward said control means and two plane cam surfaces arranged on either side of said two slanted cam surfaces for cooperation with said control means.

18. The lock of claim 11, wherein said rotating motion converting means comprise a switch roller having a slanted end surface, and wherein said safety lever is operatively connected to said switch roller for converting the rotational motion of said safety lever into a linear motion of said slide member.

19. The lock of claim 18, wherein said safety lever comprises a switch arm having a forked end, said switch roller having a stud engaged by said forked end of said switched arm.

20. The lock of claim 11, wherein said housing means comprise exchangeable insert means for mounting said slide member and said means for operating said slide member, said insert means being open toward said control means for permitting the cooperation of said slide member with said control means.

21. The lock of claim 20, wherein said safety lever and said means for tiltably mounting said safety lever are supported in said insert means.

* * * * *

UNITED STATES PATENT AND TRADEMARK OFFICE
CERTIFICATE OF CORRECTION

PATENT NO. : 4,759,203
DATED : July 26, 1988
INVENTOR(S) : Kurt Lieb, Dittmar Schwab It is certified that error appears in the above-identified patent and that said Letters Patent is hereby corrected as shown below: Title page:

[73] Assignee: YMOS AKTIENGESELLSCHAFT
Industrieprodukte
Obertshausen
Federal Republic of Germany

[22] Filed: October 16, 1986

Signed and Sealed this

Tenth Day of January, 1989

*Attest:*

DONALD J. QUIGG

*Attesting Officer*  *Commissioner of Patents and Trademarks*